United States Patent [19]

Ahlstone

[11] Patent Number: 4,601,608

[45] Date of Patent: Jul. 22, 1986

[54] SUBSEA HYDRAULIC CONNECTION METHOD AND APPARATUS

[75] Inventor: Arthur G. Ahlstone, Ventura, Calif.

[73] Assignee: Shell Offshore Inc., Houston, Tex.

[21] Appl. No.: 703,012

[22] Filed: Feb. 19, 1985

[51] Int. Cl.$^4$ .............................................. F16L 1/04
[52] U.S. Cl. ................................... 405/169; 166/344; 285/27; 285/306; 285/920
[58] Field of Search .............. 405/169, 171, 188, 190; 166/341, 344, 350, 351; 285/18, 24, 27, 306, DIG. 1

[56] References Cited

U.S. PATENT DOCUMENTS

| | | | |
|---|---|---|---|
| 3,846,992 | 11/1974 | Liautaud | 405/169 |
| 4,046,192 | 9/1977 | Darnborough et al. | 166/344 X |
| 4,386,659 | 6/1983 | Shotbolt | 166/344 X |
| 4,490,073 | 12/1984 | Lawson | 166/344 X |

Primary Examiner—Alan Cohan
Assistant Examiner—John A. Rivell

[57] ABSTRACT

A hydraulic connection apparatus for use by divers or an underwater vehicle is disclosed which allows pressurized hydraulic fluid to be supplied to hydraulically-actuated devices carried upon subsea equipment. A pressurized fluid source carried by the underwater vehicle is placed in fluid communication with the hydraulically-actuated devices by the connection apparatus. The connection apparatus comprises a buoyant device that is allowed to float upwardly into a receptacle carried by a portion of the subsea equipment. Co-operating hydraulic connection elements carried by the buoyant device and the receptacle provide a pressure tight seal between the device and the receptacle. Pressurized hydraulic fluid then flows from the buoyant device and through the receptacle to the hydraulically-actuated devices carried upon the subsea equipment.

13 Claims, 4 Drawing Figures

SUBSEA HYDRAULIC CONNECTION METHOD AND APPARATUS

BACKGROUND OF THE INVENTION

1. Field of the Invention

The present invention relates to an apparatus for use in supplying auxiliary pressurized hydraulic fluid to a subsea equipment assembly near the ocean floor.

2. Description of the Prior Art

As offshore drilling operations progress into deeper waters, the use of fixed, bottom-supported drilling structures decreases. Instead, dynamically-positioned drilling vessels are used in water depths usually greater than 1,000 feet. To drill a deepwater well, one of these drilling vessels is usually positioned above a subsea wellhead located upon the ocean floor and a pipe assembly, commonly called a riser, is extended downwardly from the vessel to the subsea wellhead.

The lower end of the riser usually contains hydraulically actuated well control valves and equipment coupling devices used to connect the lower end of the riser to the subsea wellhead. Pressurized hydraulic fluid supplied from the drilling vessel via hydraulic cables is used to actuate these hydraulic devices.

At times, the hydraulic cables may be damaged during drilling operations, severing the source of pressurized hydraulic fluid that is supplied to the hydraulically-actuated devices.

Without the assistance of divers or remotely operated vehicles (R.O.V.s), the entire riser assembly would have to be retrieved to the surface in order to repair the hydraulic system failure, an operation that would require the retrieval of thousands of feet of pipe riser at a cost of up to a million dollars.

Since divers cannot be safely used to repair subsea equipment which is located at depths which may approach 7,000 feet, the task of repairing the hydraulic system failure would fall to an R.O.V., if the R.O.V. is capable of performing the hydraulic system repair operation. As set forth in U.S. Pat. No. 3,463,226, entitled "Underwater Wellhead Apparatus", issued Aug. 26, 1969, to Glenn D. Johnson, and in U.S. Pat. No. 3,354,658, entitled "Apparatus for Performing Underwater Operations", issued Nov. 28, 1967, to Sam Leonardi, and R.O.V. may supply air to a sunken vessel or turn bolts attached to a subsea wellhead by a manipulator arm carried by the R.O.V.

However, it may not be possible for the R.O.V. to hydraulically connect an auxiliary source of pressurized hydraulic fluid to the subsea blowout preventer stack, lower riser package or xmas tree to repair or bypass the damaged hydraulic system. Even during the most optimistic R.O.V. operating conditions, the probability of successfully connecting two small diameter high pressure hydraulic cables is minimal at best. The chances of completion of a successful hydraulic connection between the R.O.V. and the riser, blowout preventer stack or xmas tree are decreased even further if the riser, while suspended beneath the drilling vessel, moves upward and downward due to ocean waves which impact the drilling vessel. The operator of the R.O.V., or even a diver if the water depth is shallow enough, would be presented with a "moving target" as the riser vertically oscillates through the water.

Accordingly, it is essential to provide a method and apparatus to allow the hydraulic connection of a source of pressurized hydraulic fluid to a riser or subsea blowout preventer stack or xmas tree, under all possible subsea conditions, without having to retrieve the entire riser assembly to the surface to complete the hydraulic connection.

SUMMARY OF THE INVENTION

In a preferred embodiment of the present invention, a buoyant apparatus is carried to and positioned beneath a receptacle mounted on either the riser or the subsea blowout preventer stack or xmas tree. The receptacle forms a downwardly-facing chamber that receives the buoyant apparatus when the apparatus is floated upwardly into the chamber.

Co-operating hydraulic connection elements carried by the buoyant apparatus and the receptacle subsequently form a pressure tight-seal and allow pressurized hydraulic fluid to flow from the buoyant apparatus through the receptacle to the hydraulically-actuated devices which form a portion of the riser or subsea blowout preventer stack or xmas tree.

It is an object of the present invention to provide a method of hydraulic connection of a pressurized hydraulic fluid supply to the hydraulically-actuated devices which form a portion of the subsea blowout preventer stack, xmas tree, or riser assembly.

It is a further object of the present invention to provide a buoyant apparatus capable of pressure tight engagement with the receptacle carried by a portion of the subsea blowout preventer stack, xmas tree or riser assembly.

These and other features and advantages of the present invention will become apparent from the following detailed description, wherein reference is made to the Figures in the accompanying drawings.

DESCRIPTION OF THE PREFERRED EMBODIMENT

Figure 1:
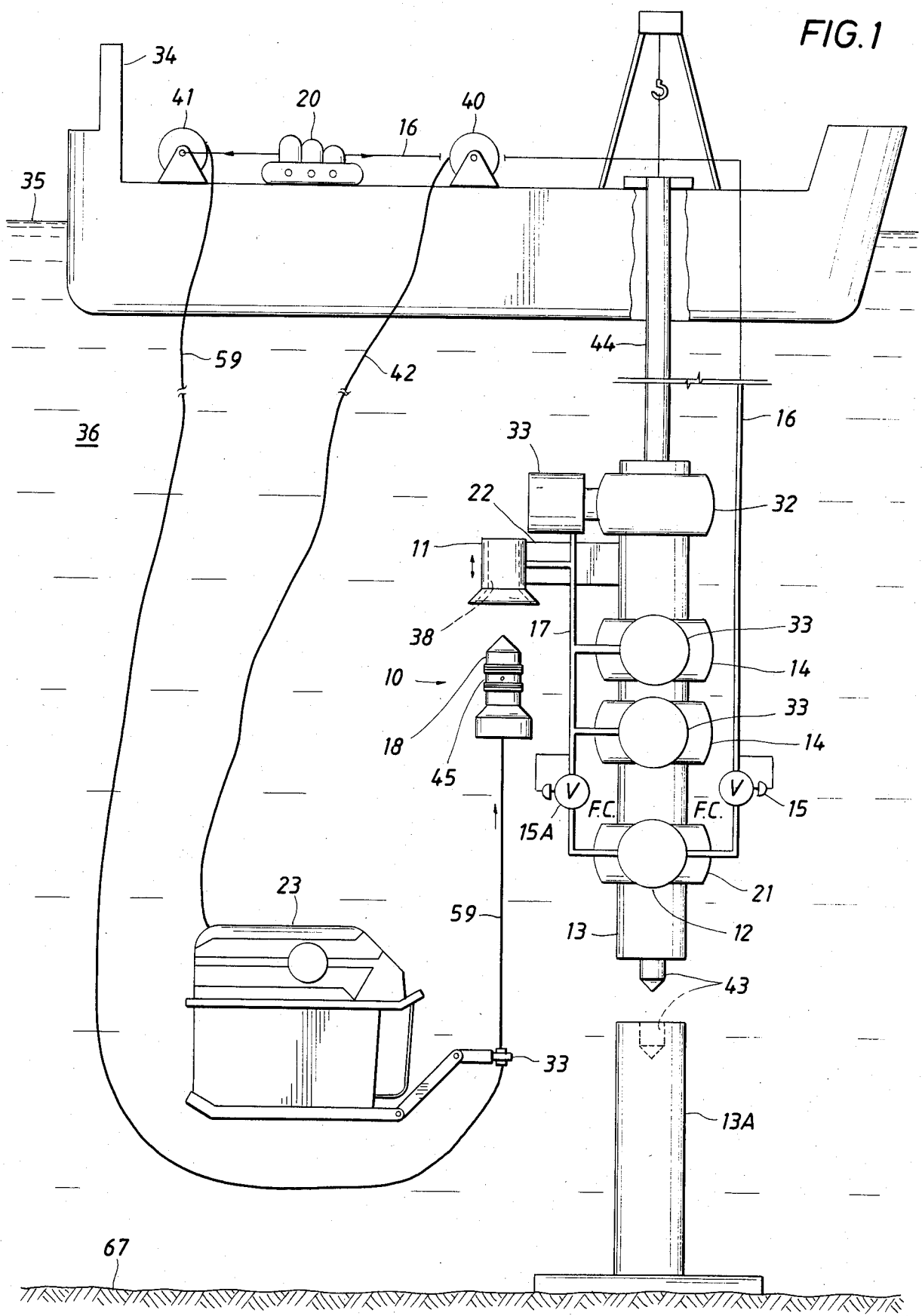
FIG. 1 is a schematic representation of an underwater vehicle positioned adjacent a subsea equipment assembly.

Referring now to FIG. 1, a vessel 34 is shown floating upon the surface 35 of the body of water 36. A riser assembly 44 extends downwardly from the vessel 34 towards the bottom of the body of water 67. The lower elements of the riser assembly 44 consist of a subsea equipment assembly 13 which might be a subsea blowout preventer stack, xmas tree assembly, lower marine riser package, etc., and subsea equipment assembly 13A such as a wellhead assembly typically positioned upon the bottom of the body of the water 67 and used for drilling and completion operations.

In the foregoing description, the term subsea equipment assembly 13, 13A is meant to include any assemblage of components either fixedly or removably secured to the top of one or more strings of pipe extending into the ocean floor 67, either during the drilling, completion, production, reworking, or maintenance of a well. Thus, during the drilling of a well, the subsea equipment assembly 13, 13A may comprise certain components such as blow out preventers, valves, connectors, etc., which would not be included therein when the well was being produced.

It is also recognized that the apparatus and methods of the present invention can be used on other equipment submerged beneath a body of water 36. For the purposes of the present discussion, the subsea equipment assembly 13, 13A comprises various components such as a subsea equipment connection 43, a hydraulically-actuated valve 21 actuated by valve actuator 12, and hydraulically-actuated valves 14, 32 also actuated by hydraulic actuators 33, well known to the art.

A buoyant hydraulic fluid supply connector apparatus 10 of the present invention is shown floating beneath the receptacle 11 which is supported from the subsea equipment assembly 13 by support 22. In a preferred embodiment the buoyancy of the apparatus 10 is by inclusion of buoyant material means 18 (FIG. 2) within the structure of the buoyant apparatus 10. The buoyant material means 18 may take the form of Eccofloat TG-28A foam, which has an average density of 29 lbs per cubic foot. This material is available from Emerson & Cummings, Inc., 869 Washington Street, Canton, Mass. 02021. It is recognized that many other means well known to the art may be used to supply upward buoyancy to the buoyant apparatus 10.

The buoyant apparatus 10 is restrained at its lower end by a conduit 59, such as a hydraulic cable well known to the art, which is shown gripped by a manipulator arm 33 carried by an underwater vehicle 23. In a preferred embodiment, the conduit 59 is capable of supplying hydraulic fluid to the buoyant apparatus 10. The conduit 59 is shown routed to the surface vessel's 34 which 41. Pressurized hydraulic fluid is supplied from a fluid source means 20 to the winch 41 and then downwardly through the conduit 59 to the buoyant hydraulic fluid supply connector apparatus 10 by means well known to the art. The conduit 59 is preferably of neutral buoyancy.

The underwater vehicle 23 may be powered by a power and signal transmission cable 42 which has been reeled off the surface vessel's 34 winch 40. The underwater vehicle 23 may be remotely operated from the vessel 34 by observation of TV signals received from cameras (not shown) carried by the underwater vehicle 23. Thrusters (not shown) carried by the vehicle 23 may be used to position the vehicle 23 adjacent the subsea equipment assembly 13. Alternatively, a diver (not shown) may also be used to position the buoyant apparatus 10 beneath the receptacle 11 in shallow water depths.

Receptacle 11 has an open bottom and a receptacle chamber 38 (FIG. 2) defined upwardly therein. The receptacle 11 incorporates hydraulic fluid connection means 17 such as a hydraulic conduit or line which terminates in an open-ended manner in the interior of the receptacle chamber 38. The hydraulic fluid connection means 17 are subsequently placed in fluid communication with valve actuators 33, which actuate valves 14, 32 carried by the subsea equipment assembly 13. As explained later, the fluid connection means 17 may also supply pressurized hydraulic fluid to the valve actuator 12, to allow actuation of valve 21.

In a preferred embodiment, the buoyant apparatus 10 also incorporates hydraulic fluid connection means 45 which are capable of fluid communication with the corresponding fluid connection means 17 carried within the receptacle 11.

In operation, prior to lowering the buoyant apparatus 10 down through the body of water 36, the underwater vehicle 23 may be operatively engaged with the buoyant apparatus 10 by means of a manipulator arm 33, which may grip a portion of the hydraulic conduit 59 below the buoyant apparatus 10 in order to cause the buoyant apparatus 10 to float above the underwater vehicle 23 when both are submerged below the surface 35 of the body of water 36.

The buoyant apparatus 10 is then lowered downwardly through the body of water 36. A diver (not shown), or the underwater vehicle 23, thereafter positions the buoyant apparatus 10 substantially centrally beneath receptacle chamber 38 of the receptacle 11. The buoyant apparatus 10 is hereafter floated upwardly into the receptacle chambr 38. Due to engagement of the shoulder means portion 26 with the receptacle funnel 30 (FIG. 2), the buoyant apparatus 10 hydraulic fluid connection means 45 become operatively positioned adjacent the hydraulic fluid connection means 17 located within the receptacle 11. At this point at least one of the hydarulic fluid connection menas 17, 45 may be hydraulically or mechanically actuated to provide a pressure tight seal between both of the fluid connection means 45, 17, by means well known to the art. Or the pressure tight seal may already have been established by the slideable engagement between both fluid connection means 45, 17.

Finally, a supply of pressurized hydraulic fluid is provided from hydraulic fluid passages 29 (FIG. 2) of the buoyant tool 10, through the hydraulic fluid connection means 17, to the hydraulic actuators 33 of hydraulically-actuated devices 32, 14.

The pressurized hydraulic fluid may be routed to the hydraulic actuators 33 by directing the fluid downwardly through conduit, 59, through the hydraulic fluid passages 29 of the buoyant apparatus 10, and thereafter through the hydraulic connection means 45, 17.

After a supply of pressurized hydraulic fluid has been provided by the buoyant apparatus 10, the buoyant apparatus 10 may then be moved downwardly out of said receptacle chamber 38 to another preferred loaction.

During normal operations of valve 21 pressurized hydraulic fluid is supplied from the pressurized fluid sources means 20 through the hydraulic fluid line 16 to the control valve 15. The pressurized hydraulic fluid causes control valves 15 to open, which supplies hydraulic fluid to the hydraulic actuator 12 of hydraulically-actuated valve 21. In this manner, the valve 21 may be actuated from a surface source of pressurized fluid 20.

In the event the hydraulic fluid line 16 is damaged, the control valve 15 will fail closed since no hydraulic pressure will be supplied to the actuator of the control valve 15 to maintain valve 15 open. Valve 21 may be actuated, however, by pressurized fluid supplied from the buoyant apparactus 10. The hydraulic fluid connection means 17 need only be sufficiently pressurized to open control valve 15A in order to supply pressurized fluid to the hydraulic valve actuator 12. In this fashion, apparently disable hydraulic devices may be operated by use of the buoyant apparatus 10 even though the normal source of pressurized hydraulic fluid has been disabled due to accident or misuse.

Alternatively, the buoyant apparatus 10 may be used to selectively actuate safety valve equipment where it is desired to not control the safety equipment from the pressurized fluid source means 20. For example, valve 14 can only be actuated by use of the buoyant apparatus 10, whereas valve 21 can be actuated by either the buoyant apparatus 10 or the normal supply of pressurized fluid from the pressurized fluid source means 20.

The buoyant apparatus 10 may be easily used as the riser assembly 44 moves upward and downward through the water 36 as it is attached in sections and lowered toward the lower portion of the subsea equipment assembly 13A. Once the buoyant apparatus 10 is released upwardly within the receptacle 11, the hydraulic connection of the apparatus 10 to the valve actuators 33, 12 is complete, regardless of further vertical movement of the receptacle 11. The operator of the buoyant apparatus 10 thereafter need no longer accurately position the buoyant apparatus 10 in response to vertical oscillations of the subsea equipment assembly 13.

Figure 2:
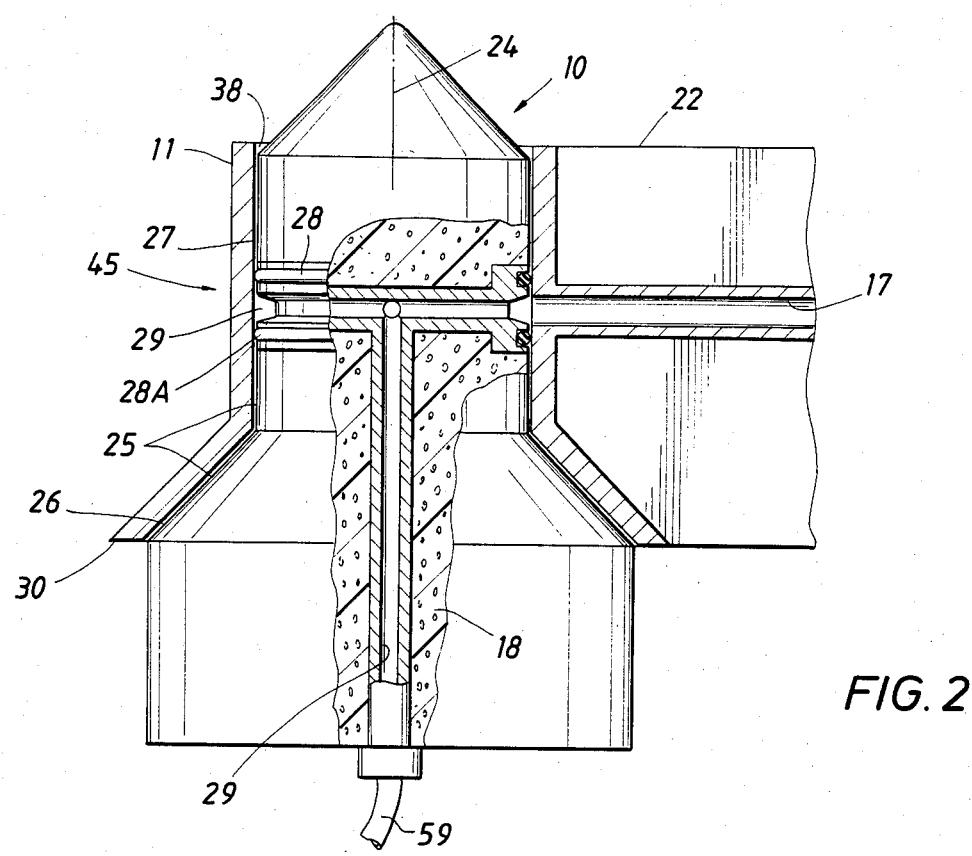
FIG. 2 is a diagrammatic view of buoyant apparatus positioned within a receptacle.

Referring now to FIG. 2, the buoyant apparatus 10 is shown after it has been floated upwardly into the receptable 11. The centralizer body means 25 which forms a major portion of the buoyant apparatus 10 has an upper centralizer portion 27 and an outwardly extending lower shoulder means portion 26. The centralizer portion 27 has an outer diameter less than the diameter of the receptacle chamber 38 in order to allow the centralizer portion 27 to move upwardly through at least a portion of the rceptacle chamber 38. The shoulder means portion 26 has an outer diameter greater than the diameter of said inner surface of the receptacle chamber 38 to prevent the centralizer body means 25 from passing completely upwardly through the receptacle chamber 38.

Hydraulic fluid connection means 45 carried by at least a portion of the centralizer body means 45 are hydraulically connectable to the hydraulic fluid connection means 17 carried by the receptacle 11. Hydraulic fluid passage means 29 carried by at least a portion of the centralizer body means 25 are hydrualically connected to the hydraulic fluid connection means 45 carried by the buoyant apparatus 10 and are also hydraulically connectable to a pressurized fluid source means (not shown) by means of a hydraulic conduit 59.

As mentioned earlier, buoyant material means 18 may comprise a substantially portion of the centralizer body means 25 in order to cause the buoyant apparatus 10 to float upward. The buoyant apparatus 10 remains positively buoyant when carrying the hydraulic fluid connection means 45 and the hydraulic fluid passage means 29. It is recognized that the fluid passage means 29 and fluid connection means 45 may be incorporated within the overall structure of the buoyant apparatus 10. Alternatively, certain portions of the fluid passage means 29 and fluid connection means 45 be carried upon the exterior surface of the buoyant apparatus 10, for example, if the fluid passage means 29 is formed from hydraulic tubing carried on the outer surface of the apparatus 10.

In a preferred embodiment, the hydraulic fluid connection means 45 is formed by an upper seal 28 or packer having a sealing surface and a lower seal 28A or packer having a sealing surface formed around the outer surface of the centralizer body means 25. These surfaces may be formed by "O-ring" gaskets or seals well known to the art. The outer diameter of the seals 28, 28A sealing surfaces may be selected to cause slideable engagement of the inner surface of the receptacle chamber 38 with th outer portion of the seals 28, 28A sealing surfaces.

The seals 28, 28A are separated by at least one hydraulic fluid passage means 29, which can be placed in fluid communication with the hydraulic fluid connection means 17 carried by the receptacle support 22 and portions of the inner surface of the receptacle chamber 38. It is recognized that many layers of "O-ring" gaskets may be used about the periphery of the buoyant apparatus 10 in order to create a series of hydraulic fluid connection means 45 placed adjacent a series of co-operating hydraulic fluid connection means 17. In this manner, an entire manifold of hydraulically actuated devices may be energized by hydraulic fluid supplied from a series of hydraulic fluid connection means 45 carried by the buoyant apparatus 10.

A receptacle funnel 30 ttached to the lower portion of the receptacle 11 aides in guiding the buoyant apparatus 10 upwardly through the receptacle 11. It is recognized that many other devices may be used to aide the proper alignment of the buoyant apparatus 10 with respect to the central vertical axis 24 of the receptacle 11.

Figure 3:
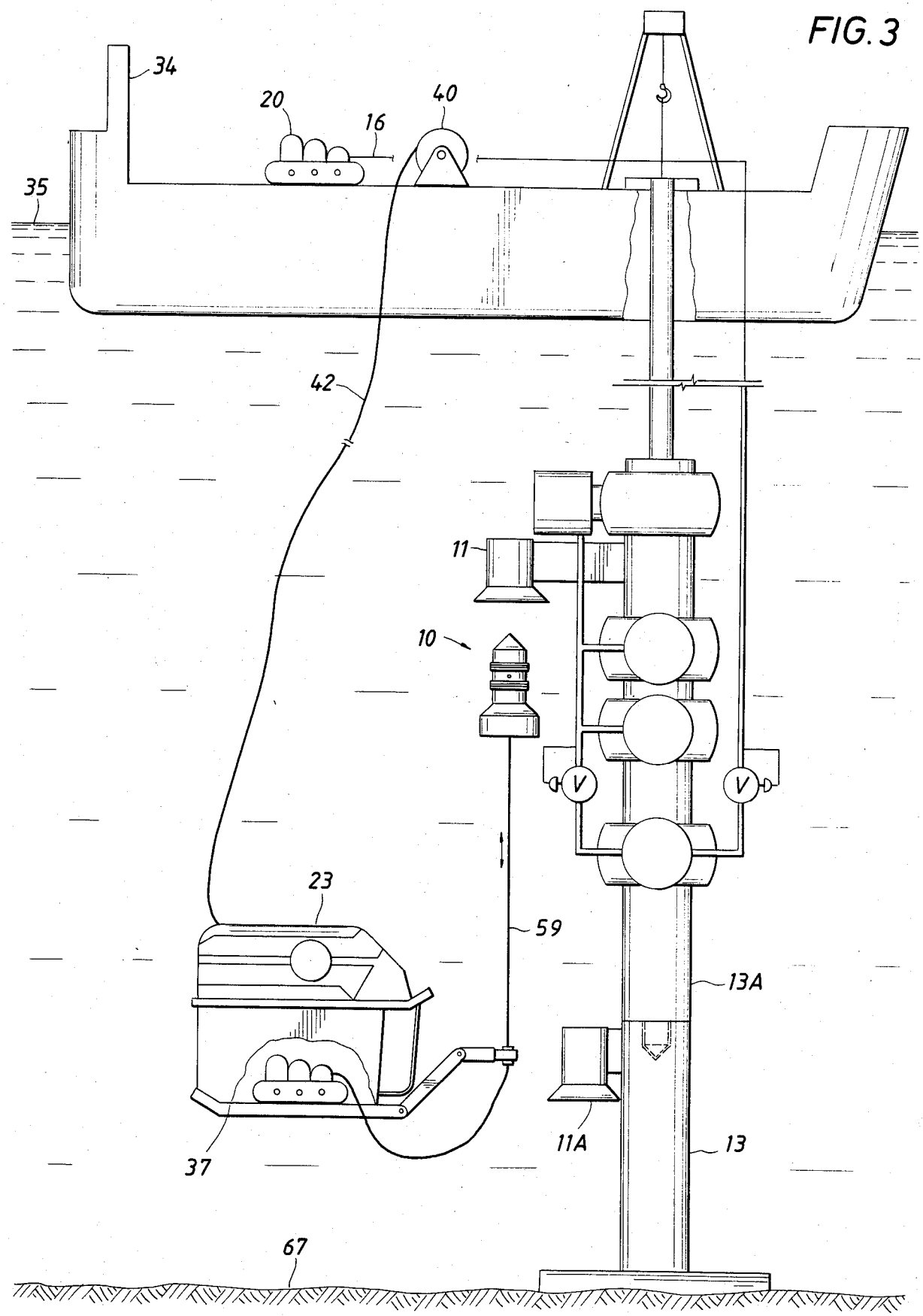
FIG. 3 is a schematic representation of an underwater vehicle positioned adjacent a subsea equipment assembly, the underwater vehicle shown carrying a pressurized fluid source.

Referring now to FIG. 3, it can be seen that a pressurized fluid source means 37 may be carried by the underwater vehicle 23, instead of by the surface vessel 34. As before, a hydraulic conduit 59 may be placed in fluid communication with the pressurized fluid source means 37 and the conduit 59 thereafter placed in fluid communication with the hydraulic fluid passage 29 of to buoyant apparatus 10. In this manner, the pressurized fluid source means 37 can be placed in fluid communication with the fluid passages 29 of the buoyant apparatus 10. This embodiment reduces the number of cables 42 that extend downwardly from the vessel 34, thereby reducing the risk of one of the cables 42, 59 becoming entangled with the underwater vehicle 23. The pressurized fluid source means 37 may be powered by the power and signal transmission cable 42 which is carried by winch 40.

Another receptacle 11A is shown mounted on or carried by subsea equipment assembly 13A. It should be recognized that a plurality of receptacles 11, 11A may be positioned in various locations about any subsea equipment assembly 13, 13A in order to operate any selection of hydraulic devices.

Figure 4:
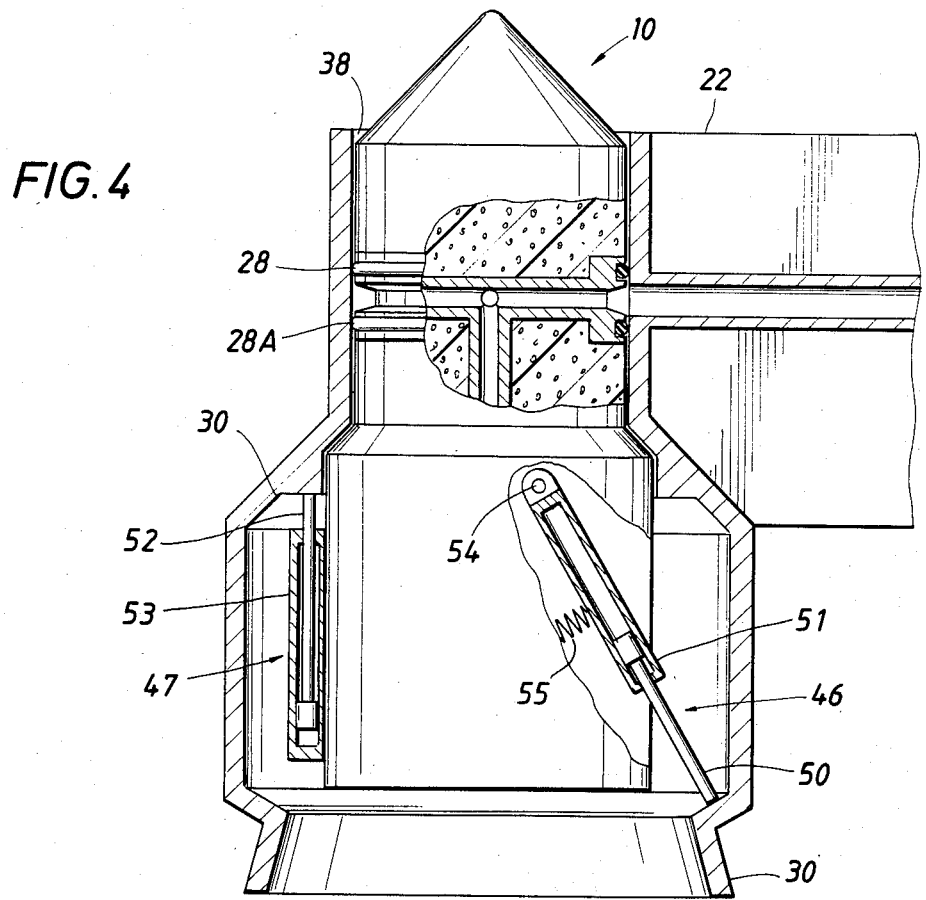
FIG. 4 is a diagrammatic view of the buoyant apparatus equipped with retainer and retraction means.

Referring now to FIG. 4 retainer means 46 and retraction means 47 are shown which may form a portion of the buoyant tool 10. In a preferred embodiment the retainer means 46, which may comprise a hydraulic piston 50 and cylinder 51 well known to the art movably retained by pivot 54 and flexibly positioned by spring 55, may be used to assist the upward movement of the tool 10 through the receptacle chamber 38, after the upper and lower seals 28, 28A of th tool 10 have contacted the receptacle chamber 38. The retainer means 46 may be actuated by hydraulic fluid supplied by conduit 59 (FIG. 3). For purposes of clarity only one retainer means 46 is shown though it is well recognized that a plurality of retainer means 46 may be spaced circumferentially about the tool 10.

In a preferred embodiment retraction means 47, which may comprise a hydraulic piston 52 and cylinder 53 well know to the art fixedly secured to the buoyant tool 10, may be used to assist in forcing the tool 10 downwardly out of receptacle chamber 38, after the upper and lower seals 28, 28A have contacted the receptacle chamber 38. The retraction means 47 may be actuated by hydraulic fluid supplied by conduit 59 (FIG. 3). For purposes of clarity only one retraction means 47 is shown though it is well recognized that a plurality of retraction means 47 may be spaced circumferentially about the tool 10.

Many other variations and modifications may be made in the apparatus and techniques herein described, both by those having experience in this technology, without departing from the concept of the present invention. Accordingly, it should be clearly understood that the apparatus and methods depicted in the accompanying drawing and referred to in the foregoing descriptions are illustrative only and are not intended as limitations on the scope of the invention.

I claim as my invention:

1. Method of supplying pressurized hydraulic fluid to the hydraulic actuators of hydraulically-actuated devices carried by a subsea equipment assembly located beneath the surface of a body of water, said subsea equipment assembly carrying a receptacle having an open bottom and a chamber defined upwardly therein, said receptacle including hydraulic fluid connection means therein, said hydraulic fluid connection means being in fluid communication with at least one of said hydraulic actuators of at least one of said hydraulically-actuated devices, said method comprising;
   above the surface of said body of water, providing a buoyant hydraulic fluid supply connector apparatus, having hydraulic fluid passages and hydraulic fluid connection means,
   lowering said buoyant apparatus downwardly through said body of water,
   positioning said buoyant apparatus substantilly centrally beneath said receptacle chamber,
   floating said buoyant apparatus upwardly into said receptacle chamber,
   operatively positioning said buoyant apparatus hydraulic fluid connection means adjacent said hydraulic fluid connection means located within said receptacle, and
   providing a supply of pressurized hydraulic fluid through said hydraulic fluid passages of said buoyant apparatus and said receptacle to at least one of said hydraulic actuators of said hydraulically-actuated devices carried by said subsea equipment assembly.

2. The method of claim 1 including, prior to the step of lowering said buoyant apparatus downwardly through said body of water;
   providing an underwater vehicle equipped with thrusters adapted to be powered and operated, and
   operatively engaging said underwater vehicle with said buoyant apparatus.

3. The method of claim 1 including, after providing a supply of pressurized hydraulic fluid to said hydraulic-aly-actuated devices, the step of;
   moving said buoyant apparatus downwardly out of said receptacle.

4. The method of claim 1 including, after operatively positioning both hydraulic fluid connection means adjacent each other, the step of;
   actuating at least one hydraulic fluid connection means to provide a pressure tight seal between both of said fluid connection means.

5. The method of claim 1 wherein the step of providing a supply of pressurized hydraulic fluid from said buoyant apparatus to said hydraulic actuators of said hydraulically-actuated device includes the steps of;
   providing a pressurized fluid source means at the surface of said body of water,
   providing a hydraulic conduit extending downwardly from said pressurized fluid source means to said buoyant apparatus, and
   placing said pressurized fluid source means in fluid communication with said hydraulic conduit said hydraulic fluid passages of said apparatus, and said hydraulic actuators of said hydraulically-actuated devices carried by said subsea equipment assembly.

6. The method of claim 2 wherein the step of operatively engaging said underwater vehicle to said buoyant apparatus further includes the steps of;
   providing a pressurized fluid source means carried by said underwater vehicle,
   providing a hyraulic conduit placed in fluid communication with said pressurized fluid source means, and,
   placing said hydraulic conduit in fluid communication with said hydraulic fluid passages of said buoyant apparatus, thereby placing said hydraulic fluid passages of said buoyant apparatus in fluid communication with said pressurized fluid communication with said pressurized fluid source means carried by said underwater vehicle.

7. The method of claim 1 of operatively positioning said buoyant apparatus hydraulic fluid connection means adjacent said hydraulic fluid connection means located within said receptacle further including the steps of;
   providing said buoyant apparatus with retainer means capable of driving said buoyant apparatus upwardly into said receptacle, and
   energizing said retainer means.

8. The method of claim 3 of moving said buoyant apparatus downwardly out of said receptacle chamber further including the steps of;
   providing said buoyant apparatus with retraction means capable of driving said buoyant apparatus downward out of said receptacle, and
   energizing said retraction means.

9. For use in combination with a subsea equipment assembly located beneath the surface of a body of water having hydraulically-actuated devices, said hydraulic actuators of said devices placed in fluid communication with hydraulic fluid connection means carried by a receptacle, said receptacle supported by said subsea equipment assembly and having a chamber and throughpassage defined upwardly therein, the improvement comprising a buoyant hydraulic fluid supply connector apparatus for connecting a supply of pressurized hydraulic fluid from a pressurized fluid source means to said hydraulic fluid connection means carried by said receptacle, said apparatus comprising;
   centralizer body means having an upper centralizer portion and an outwardly-extending lower shoulder means portion, said centralizer body means having at least a positive buoyancy, said centralizer portion having an outer diameter less than the diameter of said receptacle chamber, to allow said centralizer portion to move upwardly through a portion of said receptacle chamber,
   shoulder means portion formed on said body means having an outer diameter greater than the diameter of the throughbore of said receptacle, to prevent said cnetralizer body means from passing completely through said receptacle chamber, hydraulic fluid connection means carried by at least a portion of said centralizer body means and being hydraulically connectable to said hydraulic fluid connection means carried by said receptacle, and hydraulic fluid passage means carried by at least a portion of said centralizer body means, hydraulically connected to said hydraulic fluid connection means carried by said apparatus, and being hydraulically connectable to said pressurized fluid source means.

10. The apparatus of claim 9 wherein a portion of said centralizer body means comprises;

buoyant material means to maintain said centralizer body means positively buoyant when carrying said hydraulic fluid connection means and said hydraulic fluid passage means.

11. The apparatus of claim 9 wherein said hydraulic fluid connection means of said buoyant apparatus further comprises an upper seal having a sealing surface and a lower seal having a sealing surface, both seals formed around an outer surface of said centralizer body means, said seals slideably engageable with the inner surface of said receptacle, said upper seal and said lower seal separated by at least one of said hydraulic fluid passage means.

12. The apparatus of claim 9 wherein said centralizer body means further includes retraction means to drive said tool downward out of said receptacle.

13. The apparatus of claim 9 wherein said centralizer body means further includes retainer means to drive said tool upward into engagement with said receptacle.

* * * * *